(12) United States Patent
Milea et al.

(10) Patent No.: US 11,108,588 B2
(45) Date of Patent: Aug. 31, 2021

(54) CONFIGURATION INFORMATION TO AN INTERNET OF THINGS MULTIPLEXER

(71) Applicant: Wind River Systems, Inc., Alameda, CA (US)

(72) Inventors: Danut Gabriel Milea, Mangalia (RO); Catalin Costea, Galati (RO); Alex DeVries, Kanata (CA)

(73) Assignee: Wind River Systems, Inc., Alameda, CA (US)

(*) Notice: Subject to any disclaimer, the term of this patent is extended or adjusted under 35 U.S.C. 154(b) by 0 days.

(21) Appl. No.: 16/280,363

(22) Filed: Feb. 20, 2019

(65) Prior Publication Data

US 2020/0267017 A1    Aug. 20, 2020

(51) Int. Cl.
*H04L 12/28* (2006.01)
*H04L 29/06* (2006.01)
*H04L 12/24* (2006.01)

(52) U.S. Cl.
CPC ...... *H04L 12/2834* (2013.01); *H04L 12/2838* (2013.01); *H04L 41/0853* (2013.01); *H04L 63/0853* (2013.01)

(58) Field of Classification Search
CPC ............. H04L 12/2834; H04L 12/2838; H04L 41/0853; H04L 63/0853
See application file for complete search history.

(56) References Cited

U.S. PATENT DOCUMENTS

| | | | |
|---|---|---|---|
| 9,900,171 B2* | 2/2018 | Guedalia | H04L 67/12 |
| 10,346,614 B1* | 7/2019 | Ko | H04L 9/3247 |
| 2004/0117491 A1* | 6/2004 | Karaoguz | H04L 65/4084 |
| | | | 709/229 |
| 2017/0155703 A1* | 6/2017 | Hao | H04L 67/12 |
| 2017/0257341 A1* | 9/2017 | Arsenault | H04L 67/303 |
| 2017/0364908 A1* | 12/2017 | Smith | G06Q 20/023 |
| 2018/0007040 A1* | 1/2018 | Thom | G06F 21/575 |
| 2018/0035248 A1* | 2/2018 | Soave | H04W 12/04 |
| 2018/0091506 A1* | 3/2018 | Chow | G06Q 20/085 |
| 2018/0196945 A1* | 7/2018 | Kornegay | H04L 9/0897 |
| 2018/0255037 A1* | 9/2018 | Bender | H04W 4/70 |
| 2019/0288913 A1* | 9/2019 | Salgueiro | H04L 41/082 |
| 2019/0372834 A1* | 12/2019 | Patil | H04L 41/085 |

* cited by examiner

*Primary Examiner* — Mohamed A. Wasel
(74) *Attorney, Agent, or Firm* — Fay Kaplun & Marcin, LLP (57) ABSTRACT

A method and system for providing configuration information to an Internet of Things (IoT) device. The method is performed at an IoT device and includes identifying a predetermined condition. The method further includes transmitting, via a network, a first signal to a first server based on identifying the predetermined condition and receiving ownership information from the first server. The ownership information includes contact information for a second server that is configured to provide configuration information to the IoT device. The method further includes transmitting a second signal to the second server and receiving configuration information from the second server. The method further includes performing an operation based on the configuration information.

20 Claims, 3 Drawing Sheets

CONFIGURATION INFORMATION TO AN INTERNET OF THINGS MULTIPLEXER

BACKGROUND

An internet of things (IoT) device may refer to a wide variety of different types of devices. IoT devices typically include processors that execute software and have the hardware/software to connect to the Internet or other type of network. In this manner, IoT devices may be configured to perform various operations. Configuring an IoT device to perform a particular operation may include inputting/updating instructions to be executed by the IoT device.

Deploying and configuring an IoT device may include directly accessing the hardware, software and/or firmware of the IoT device. Conventionally, as a number of IoT devices in a group of IoT devices to be configured increases, the amount of time and cost to configure the group also increases. The increase in time and cost is due to the process of directly accessing the hardware, software and/or firmware of each IoT device within the group to input the instructions to be executed by each IoT device.

SUMMARY

The exemplary embodiments are directed to a method for receiving configuration information at an IoT device. The method includes identifying a predetermined condition and transmitting, via a network, a first signal to a first server based on identifying the predetermined condition. The method further includes receiving ownership information from the first server. The ownership information includes contact information for a second server that is configured to provide configuration information to the IoT device. The method further includes transmitting a second signal to the second server and receiving configuration information from the second server. The method further includes performing an operation based on the configuration information.

The exemplary embodiments are directed to an IoT device. The IoT device includes a transceiver configured to establish a connection with a network. The IoT device further includes a processor configured to execute instructions. The instructions include identifying a predetermined condition and generating a first signal that is to be transmitted to a first server based on identifying the predetermined condition. The instructions further include receiving ownership information from the first server. The ownership information includes contact information for a second server that is configured to provide configuration information to the IoT device. The instructions further include generating a second signal that is to be transmitted to a second server and receiving configuration information from the second server. The instructions further include performing an operation based on the configuration information.

The exemplary embodiments are directed to a computer-readable storage medium including a set of instruction that is executable by a processor to cause the processor to perform operations. The operations include identifying a predetermined condition and generating a first signal that is to be transmitted to a first server based on identifying the predetermined condition. The operations further include, receiving ownership information from the first server. The ownership information includes contact information for a second server that is configured to provide configuration information to the IoT device. The operations further include, generating a second signal that is to be transmitted to a second server and receiving configuration information from the second server. The operations further include executing an operation based on the configuration information.

DETAILED DESCRIPTION

The exemplary embodiments may be further understood with reference to the following description and the related appended drawings, wherein like elements are provided with the same reference numerals. The exemplary embodiments are related to a device, system and method for deploying one or more Internet of Things (IoT) devices and managing the configuration of the IoT devices.

An IoT device may refer to a wide variety of different types of devices that are configured to connect to a network. Throughout this description any reference to an IoT device as a specific type of device or performing a specific operation is merely provided for illustrative purposes. The exemplary embodiments are not limited to IoT devices, as different entities may refer to similar devices by a different name. Therefore, the IoT device described herein is used to represent any device that is configured with the hardware, software and/or firmware to connect to a network, receive and transmit data.

The IoT device may be configured to perform a particular operation based on information received from a server. For example, the operator of the IoT device may store instructions to be executed by the IoT device in the server. The IoT device may be triggered to send a signal to the server based on a predetermined condition. In response, the server may provide the IoT device with the instructions. Subsequently, the IoT device may operate in accordance with the instructions received from the server. Thus, the server enables the operator of the IoT device to configure the IoT device and any number of further IoT devices remotely and without having to directly interface with the hardware, software and/or firmware of any of the IoT devices.

One server may be permitted to configure the IoT device based on information stored in another server. For example, a first server may store contact information corresponding to the second server. The IoT device may be triggered to send a signal to the first server based on a predetermined condition. In response, the first server may determine the identity of the IoT device and provide the contact information of the second server. Subsequently, the IoT device may contact the second server to receive instructions to perform a particular operation. Thus, the IoT device may participate in a first signaling exchange (e.g., with the first server) to determine the entity that is permitted to configure the IoT device and a second signaling exchange (e.g., with the second server) to configure the IoT device to perform a particular operation. The first server enables an operator (e.g., owner, manufacturer, etc.) of the IoT device to permit a different entity to configure the IoT device without either party having to directly interface with the hardware, software and/or firmware of any of the IoT devices. Exemplary embodiments of these signaling exchanges will be described in greater detail below.

The exemplary embodiments are described with regard to configuration information that corresponds to the IoT device. Throughout this description configuration information may refer to any type of information and/or data that is intended to be utilized by the IoT device to perform an operation. In some exemplary scenarios, configuration information may refer to application payload data, incoming/outgoing traffic filtering rules, multimedia data, operating values, settings, parameters, updates, alerts, notifications, audio data, messages, video data, data corresponding to a service that is to be provided by the IoT device, user input, instructions to be executed by the IoT device or any combination thereof. However, any reference to a specific type of information and/or data as configuration information is merely provided for illustrative purposes. The exemplary embodiments may refer to any type of information and/or data that is intended to be utilized by the IoT device to perform an operation.

Deploying and managing the IoT device may include a signaling exchange between the IoT device and a server that manages access to the configuration information corresponding to the IoT device. Throughout this description, this server may be referred to as an end-point server. However, reference to an end-point server is merely for illustrative purposes. The exemplary embodiments may be utilized with any electronic component that is configured with the hardware, software and/or firmware to manage access to stored information and/or data corresponding to the IoT device.

The exemplary embodiments may also be described with regard to ownership information that corresponds to the IoT device. Throughout this description ownership information may refer to any information that identifies a component that an operator of the IoT device utilizes to provide configuration information to the IoT device. For example, the owner of the IoT device may store configuration information corresponding to the IoT device in a server (e.g., the end-point server). The ownership information may identify an internet protocol (IP) address of the end-point server. However, any reference to a specific type of ownership information is merely provided for illustrative purposes. The exemplary embodiments may apply to any type of information and/or data that provides an indication of an entity that intends to provide configuration information to the IoT device.

Deploying and managing the IoT device may include a signaling exchange between the IoT device and a server that manages access to the ownership information corresponding to the IoT device. Throughout this description, this server may be referred to as a commissioning server. However, reference to a commissioning server is merely for illustrative purposes. The exemplary embodiments may be utilized with any electronic component that is configured with the hardware, software and/or firmware to manage access to stored information and/or data corresponding to the IoT device.

Throughout this description, the terms "owner" and "ownership" are used to describe the entity or entities that are allowed to access and update the exemplary IoT device. However, it should be understood that this entity is not limited to the actual owner of the title to the IoT device. The entity may include any entity that is authorized to access and update the IoT device including a licensed operator, a management entity, etc.

Figure 1:
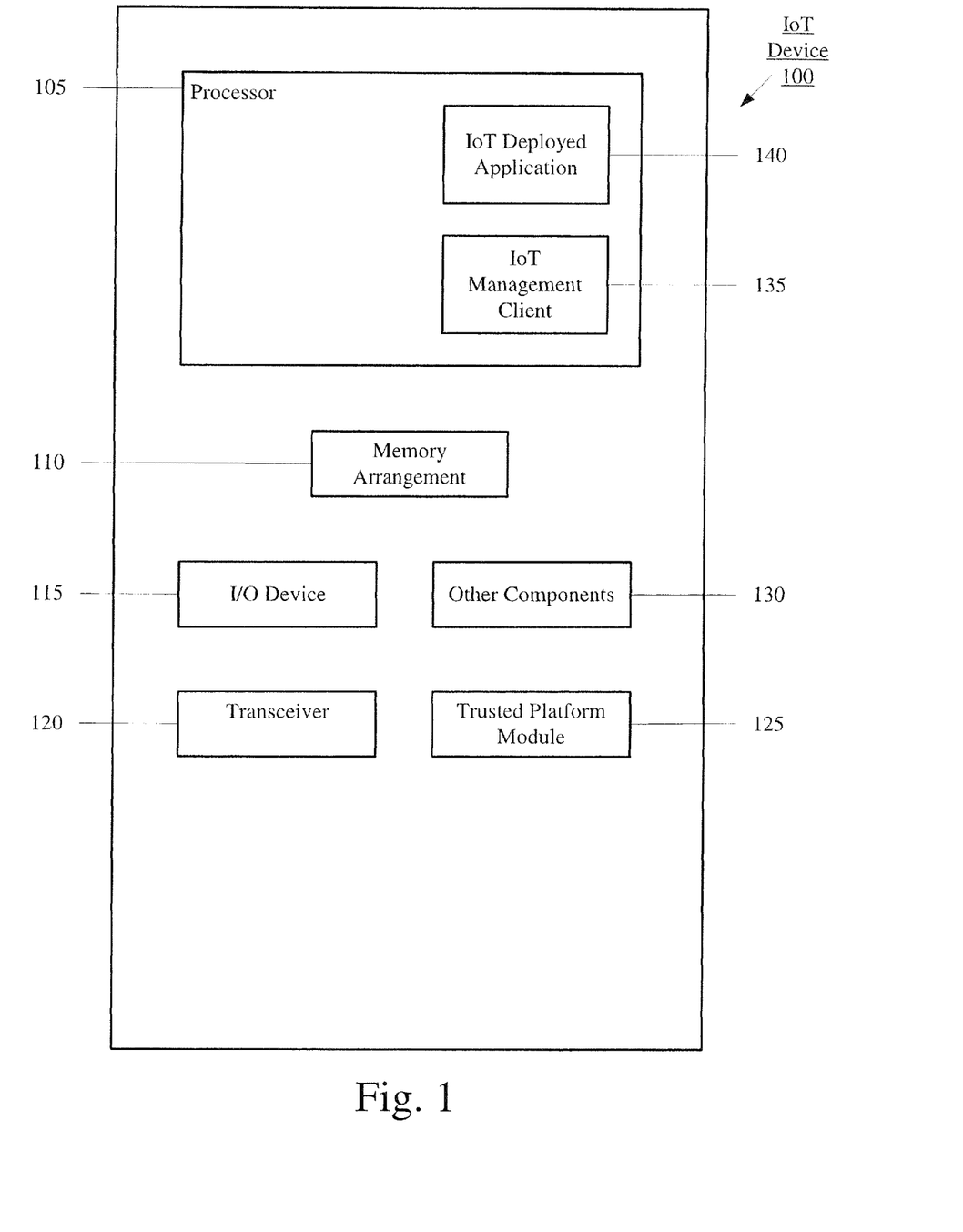
FIG. 1 shows an exemplary IoT device according to various exemplary embodiments.

FIG. 1 shows an exemplary IoT device 100 according to various exemplary embodiments. The IoT device 100 may represent any device that is configured with the hardware, software and/or firmware to connect to a network and transmit/receive data. The exemplary IoT device 100 may include a processor 105, a memory arrangement 110, an input/output (I/O) device 115, a transceiver 120, a Trusted Platform Module (TPM) 125 and other components 130. The other components 130 may include, for example, an audio input device, an audio output device, a display, a battery, an actuator, a sensor, a data acquisition device, ports to electrically connect the IoT device 100 to a power source, ports to electrically connect the IoT device 100 to other electronic components, etc.

The processor 105 may be configured to execute a plurality of applications of the IoT device 100. For example, the applications may include an IoT management client 135 and a deployed application 140. The IoT management client 135 may enable the IoT device 100 to receive ownership information and configuration information. The deployed application 140 may enable the IoT device 100 to perform a particular operation. For example, the deployed application 140 may enable the IoT device 100 to serve as an unattended vending machine or kiosk that interacts with customers. In another example, the deployed application 145 may enable the IoT device 100 to serve as a sensor or component in an industrial setting. As mentioned above, the IoT device 100 may refer to a wide variety of different devices performing various different operations and thus, the deployed application 145 may refer to any type of instructions intended to be executed by the IoT device 100.

The above referenced applications each being an application (e.g., a program) executed by the processor 105 is only exemplary. The functionality associated with the applications may also be represented as a separate incorporated component of the IoT device 100 or may be a modular component coupled to the IoT device 100, e.g., an integrated circuit with or without firmware. For example, the integrated circuit may include input circuitry to receive signals and processing circuitry to process the signals and other information. The applications may also be embodied as one application or separate applications. The exemplary embodiments may be implemented in any of these or other configurations of an IoT device.

The memory arrangement 110 may be a hardware component configured to store information and/or data related to operations performed by the IoT device 100. The I/O device 115 may be a hardware component that enables the IoT device 100 to collect data. The transceiver 120 may be a hardware component configured to establish a connection with a network. If the IoT device is configured with wireless capabilities the transceiver 120 may operate on a variety of different frequencies or channels (e.g., set of consecutive frequencies).

The TPM 125 may be a separate incorporated hardware component configured to securely store information and/or data for the IoT device 100. Thus, the TPM 125 provides dedicated storage that is separate from the memory arrangement 110. In one exemplary embodiment, the TPM 125 may be similar to a subscriber identity module (SIM) cared in a mobile phone. The TPM 125 enables the IoT device 100 to retain any stored information despite the IoT device 100 experiencing a software/firmware reset or any other similar type of event. However, reference to a TPM is merely provided for illustrative purposes, the exemplary embodiments may utilize any dedicated non-volatile secure storage or any other appropriate type of secure storage.

In some exemplary embodiments, the TPM 125 may store information related to establishing a communication channel with at least one of the commissioning server or the end-point server. For example, the TPM 125 may store information including, but not limited to, the IP address of the commissioning server, the ownership information (e.g. IP address of the end-point server), an identity of the IoT device, encryption keys, credentials or any combination thereof. Storing the information related to establishing a communication channel with at least one of the commissioning server or the end-point server in the TPM 125 enables the IoT device 100 to retain this information regardless of any event experienced by the IoT device 100 (e.g., reset, loss of information stored in the memory bank 110, etc.).

Figure 2:
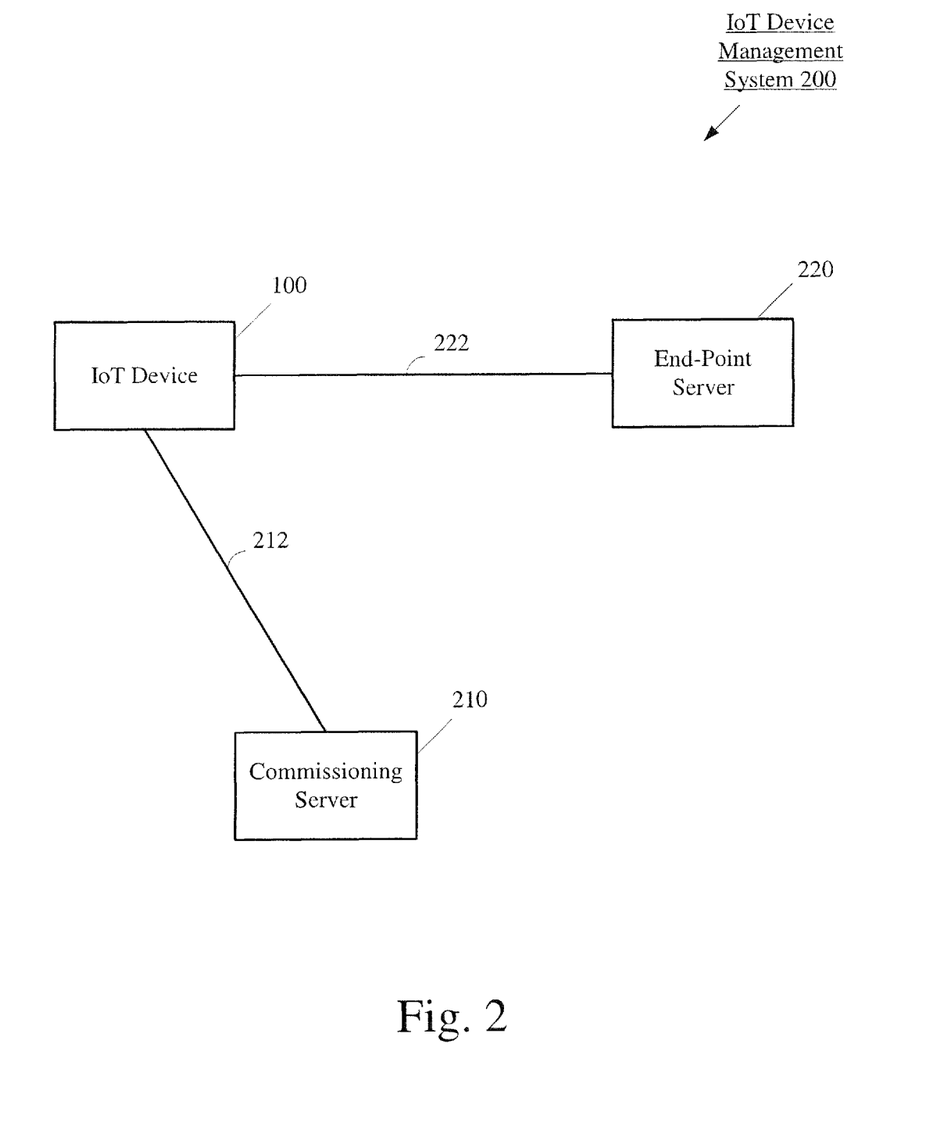
FIG. 2 shows an exemplary IoT device management system according to various exemplary embodiments.

FIG. 2 shows an exemplary IoT device management system 200 according to various exemplary embodiments. The exemplary IoT device management system 200 may include the IoT device 100, a commissioning server 210 and an end-point server 220.

The IoT device 100 may connect to a network and thus, may include a network identifier such as an IP address. In one exemplary scenario, the IoT device may connect to a wireless local area network (WLAN). The WLAN may include any type of wireless local area network (WiFi, Hot Spot, IEEE 802.11x networks, etc.). Thus, the IoT device 100 may be equipped with a wireless local access network (WLAN) chipset to communicate with the WLAN. Those skilled in the art will understand that any association procedure may be performed for the IoT device 100 to connect to the WLAN. For example, upon detecting the presence of the WLAN, the IoT device may transmit the corresponding credential information to an access point to associate with the WLAN. In one exemplary embodiment, the IoT device may connect to the network via a wired connection, such as an ethernet connection.

A typical lifecycle of the IoT device 100 may begin when a manufacturer produces the IoT device 100 by equipping the IoT device 100 with the hardware, software and/or firmware to perform a certain type of role. Subsequently, the manufacturer may sell the IoT device 100 to an operator that intends to deploy the IoT device 100 and configure the IoT device 100 to perform a particular operation. The operator may then sell the IoT device 100 to a further operator who intends to deploy the IoT device 100 and configure the IoT device 100 differently than the previous operator.

The commissioning server 210 may manage access to the ownership information corresponding to the IoT device 100. As mentioned above, ownership information may represent any information that identifies a component that an operator of the IoT device 100 utilizes to provide configuration information to the IoT device 100. Accordingly, the commissioning server 210 may be equipped with an IP address and configured to communicate via a network connection.

The commissioning server 210 may be owned and operated by the manufacturer of the IoT device 100. Alternatively, the commissioning server 210 may be owned and operated by a third-party. During the lifecycle of the IoT device 100, as control of the IoT device 100 changes from a manufacturer to an operator or from the operator to a further operator the commissioning server 210 may be updated to reflect the entity that currently has permission to configure the IoT device 100. Since the commissioning server 210 manages access to the ownership information corresponding to the IoT device 100, the transfer in control between a manufacturer to an operator or from the operator to a further operator may occur remotely without direct access to the hardware, software and/or firmware of the IoT device 100. This allows the process of transferring control of the IoT device 100 to occur regardless of the operating state of the IoT device 100 (e.g., on or off) and regardless of where the IoT device 100 is physically located. For example, transfer of control of the IoT device 100 may occur when the IoT device 100 is offline and in transit from the manufacturer to the operator.

The exemplary embodiments are not limited to an IoT device 100 that experiences the above described lifecycle. The production of the IoT device 100 may be a result of a plurality of different processes performed by a plurality of different entities. Further, the transfer of control of the IoT device 100 may represent any type of agreement between a first entity and a second entity regarding permission to configure the IoT device 100 (e.g., sale, lease, rental, etc.). The above described lifecycle is merely for illustrative purposes and the exemplary embodiments may apply to any IoT device that may have its access managed by a server based on ownership information of the IoT device stored on the server.

The commissioning server 210 may store the ownership information corresponding to the IoT device 100 in any of a variety of different ways. In one exemplary configuration, the commissioning server 210 may manage a database that includes a plurality of identification (ID) numbers, each ID number corresponding to a particular IoT device. Each ID number may be associated with a memory block that includes the IP address of server that has been assigned to provide configuration information to the associated IoT device. In another exemplary configuration, the commissioning server 210 may manage a lookup table that includes an association between an identifier associated with a particular IoT device and the coordinates of a server that has been assigned to provide the associated IoT device with configuration information. In another exemplary embodiment, the commissioning server 210 may store a correlation between the identity of the IoT device and its owner and the address server location for that owner. These exemplary configurations are merely provided for illustrative purposes, a person of ordinary skill in the art would understand that the commissioning server 210 may utilize any appropriate means to store and retrieve ownership information corresponding to the IoT device 100.

The IoT device 100 may communicate with the commissioning server 210 via the network connection. During operation, the IoT device 100 may be triggered to send a signal to the commissioning server 210. Subsequently, the IoT device 100 and the commissioning server 210 may establish a communication channel 212 to provide the ownership information to the IoT device 100. The IoT device 100 may determine the components that are permitted to provide configuration information to the IoT device 100 based on the ownership information received from the commissioning server 210.

The end-point server 220 manages access to the configuration information corresponding to the IoT device 100. As mentioned above, configuration information may refer to any type of information and/or data that is intended to be utilized by the IoT device 100 to perform an operation. Accordingly, the end-point server 220 may be equipped with an IP address and configured to communicate via a network connection. Since the end-point server 220 is used to manage access to the configuration information corresponding to the IoT device 100, the IoT device 100 may be configured to perform a particular operation without having direct access to the hardware, software and/or firmware of the IoT device 100. Thus, the IoT device 100 may be configured by an operator remotely regardless of the operating state of the IoT device 100 (e.g., on or off) and where the IoT device 100 is physically located.

The exemplary embodiments are not limited to a particular type of IoT device 100 nor are they limited to a particular type of configuration information. In one exemplary scenario, the IoT device 100 may be a vending machine or a kiosk that is intended to interact with customers while deployed. In this scenario, the configuration information may relate to operating values for hardware components of the vending machine such as, but not limited to, brightness settings for the display, brightness setting for lights, speed of actuators, volume for audio output, etc. The configuration information may also relate to other types of data including, but not limited to, application payload data, text that is to be displayed, advertisements that are to be displayed, audio sounds that are to be output, instructions related to how to perform a transaction, etc. In another exemplary scenario, the IoT device 100 may be a smart display and the configuration information may include the multimedia that is to be displayed. In a further exemplary scenario, the IoT device 100 may be deployed in an industrial setting to act as a sensor or another type of component. In another exemplary scenario, IoT device 100 may be a consumer product and the configuration information may relate to services provided by the consumer product. Thus, the exemplary embodiments may apply to various different types of IoT devices configured to perform various different types of operations.

The end-point server 220 may store the configuration information corresponding to the IoT device 100 in any of a variety of different ways. A person of ordinary skill in the art would understand that the end-point server 220 may utilize any appropriate means to store and retrieve configuration information corresponding to the IoT device 100.

The IoT device 100 may communicate with the end-point server 220 via the network connection. During operation, the IoT device 100 may be triggered to send a signal to the end-point server 220. Subsequently, the IoT device 100 and the end-point server 220 may establish a communication channel 222. To provide the configuration information corresponding to the IoT device 100. Subsequently, the IoT device 100 may operate in accordance with the configuration information.

The IoT device 100 may be configured to initiate the communication channels 212, 222. During operation, the IoT device 100 may be triggered to send a signal and initiate the communication channel 212 or the communication channel 222 based on identifying a predetermined condition. The predetermined condition may indicate to the IoT device 100 that information corresponding to the IoT device 100 (e.g., ownership information, configuration information) may be waiting to be provided to the IoT device 100. Thus, identifying the predetermined condition may trigger the IoT device 100 to send a signal to initiate one of the communication channels 212, 222. As will be described in further detail below, whether the recipient of the signal is the commissioning server 210 or the end-point server 220 may be based on information stored on the IoT device 100.

The predetermined condition may include factors such as, but not limited to, a power cycle, a change in operating states, a software/firmware reset, entering an active mode of operation, establishing a network connection, a change in network connection, a signal received via the network connection, a signal received from a point to point connection with a further device, manual input, a change in physical location, an amount of time since ownership information was last received, an amount of time since configuration information was last received, a change in physical location, a schedule, a timer, sending a signal to a further server without receiving a response, failing to establish a communication channel with a further server or any combination thereof. Throughout this description, any reference to a particular factor or factors as the predetermined condition is merely for illustrative purposes. The exemplary embodiments may apply to any predetermined condition that may indicate that information corresponding to the IoT device 100 (e.g., ownership information, configuration information) may be waiting to be provided to the IoT device 100.

Consider a first exemplary scenario, the IP address corresponding to the commissioning server 210 is stored on the IoT device 100, but the IP address corresponding to the end-point server 220 is not stored on the IoT device 100. This may occur when the IoT device 100 has not yet received any ownership information from the commissioning server 210 or if previously received ownership information is lost or deleted (e.g., manual input, hardware/software/firmware reset). Since the only IP address corresponding to the commissioning server 210 is stored on the IoT device 100, when the IoT device 100 identifies the predetermined condition the IoT device 100 may send a signal to the commissioning server 210. Subsequently, the IoT device 100 may establish the communication channel 212 and receive ownership information corresponding to the IoT device 100.

Consider a second exemplary scenario, both the IP address corresponding to the commissioning server 210 and the IP address corresponding to the end-point server 220 are stored on the IoT device 100. This may occur after the IoT device 100 has received ownership information from the commissioning server 210. Since both IP addresses are stored on the IoT device 100, the IoT device 100 may determine whether to send the signal to the IP address corresponding to the commissioning server 210 or the IP address corresponding to the end-point server 220.

In one exemplary embodiment, the IoT device 100 may select the IP address corresponding to end-point server 220. However, if the IoT device 100 receives an indication (e.g., a request to contact commissioning server 210, a wireless signal, manual input, etc.) that ownership information corresponding to the IoT device 100 may have been changed, the IoT device 100 may select the IP address corresponding to the commissioning server 210. In another exemplary embodiment, the IoT device 100 may select between the IP addresses based on any of a plurality of factors, including but not limited to, the type of predetermined condition identified, an indication that configuration information may have been updated or added, an indication that ownership information may have been changed, a change in physical location, a new network connection, a change in network connection, a timer or schedule relative to the reception of ownership information, a timer or schedule relative to the reception of configuration information, a duration the IoT device 100 has been in a power off state, a duration the IoT device 100 has been in a low power or sleep state, or any combination thereof. The above exemplary scenarios are merely provided for illustrative purposes, the IoT device 100 may determine the recipient of the signal in any appropriate manner.

The exemplary IoT device management system 200 is not limited to a single IoT device 100. An actual IoT device management system may include any number of IoT devices. For example, the transfer of control of the IoT device 100 may be part of an agreement that includes the transfer of control of multiple IoT devices. Further, any number of IoT devices may be provided with configuration information. Accordingly, an operator may acquire permission to configure a group of IoT devices that includes any number of IoT devices and subsequently, provide the group of IoT devices with configuration information without ever having direct access to the hardware, software and/or firmware of any of the IoT devices within the group of IoT devices.

Figure 3:
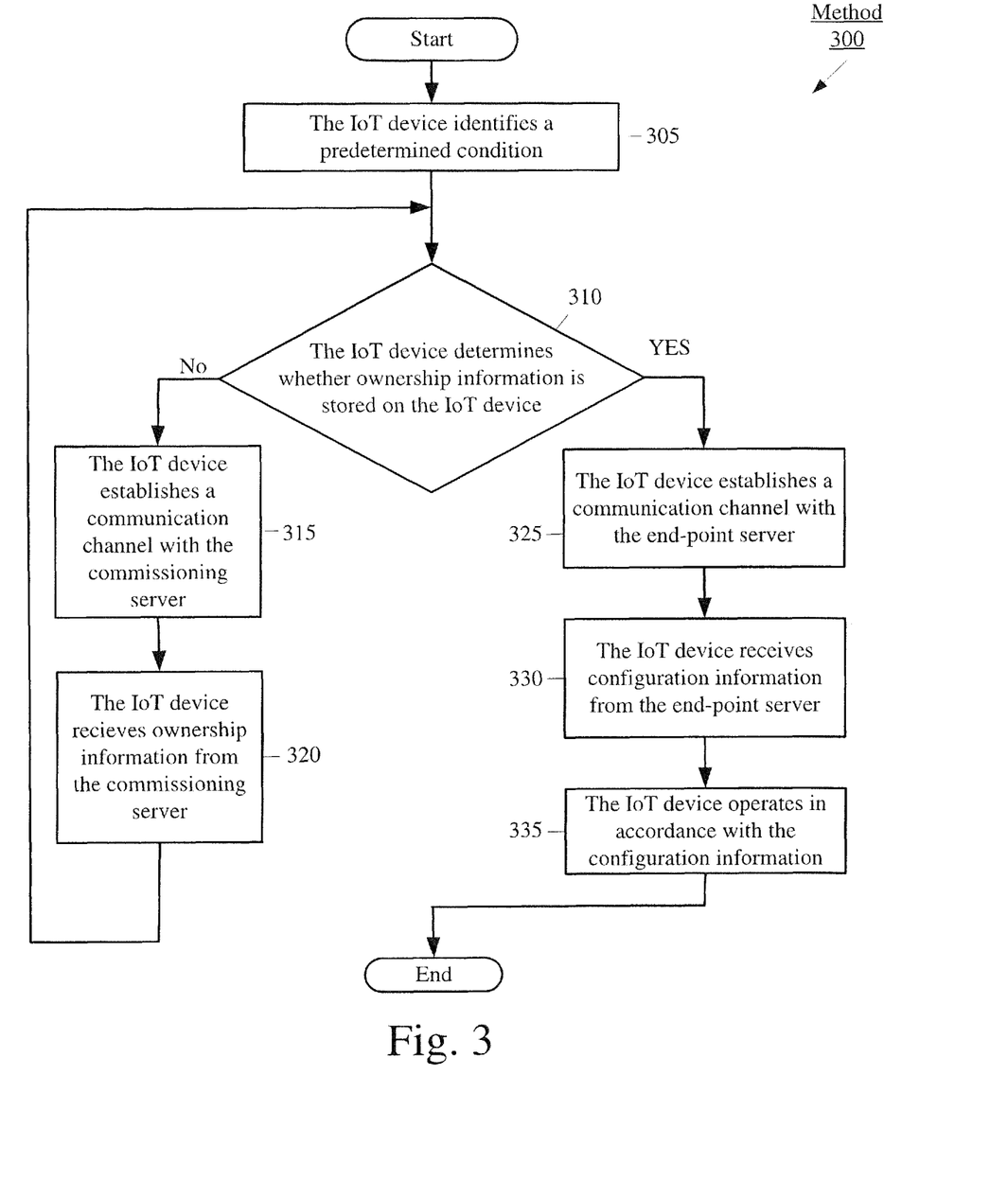
FIG. 3 shows an exemplary method for the IoT device to receive configuration information according to various exemplary embodiments.

FIG. 3 shows an exemplary method 300 for the IoT device 100 to receive configuration information according to various exemplary embodiments. The method 300 will be described with regard to the IoT device 100 of FIG. 1 and the IoT device management system 200 of FIG. 2.

Consider an exemplary scenario where an operator has acquired the IoT device 100 from a previous owner (e.g., manufacturer, previous operator, etc.). The IoT device 100 includes an ID number corresponding to the IoT device 100 and an IP address of the commissioning server 210 stored in the TPM 125. The commissioning server 210 includes a stored association between the ID number corresponding to the IoT device 100 and the IP address of the end-point server 220. The operator has inputted configuration information corresponding to the IoT device 100 into the end-point server 220 but the IoT device 100 does not have possession of the IP address corresponding to the end-point server 220.

In 305, the IoT device 100 identifies a predetermined condition. In this exemplary scenario, the predetermined condition relates to a change in operating states of the IoT device 100 which may include a transition from a power off state to a power on state. The occurrence of the predetermined condition triggers the IoT device 100 to determine the contents of the TPM 125 and establish a communication channel with a component identified in the TPM 125 via a network connection. In this exemplary scenario, the only component currently identified in the TPM 125 is the commissioning server 210.

In 310, the IoT device 100 determines whether ownership information is stored on the IoT device 100. If the IoT device 100 does not include stored ownership information, the method 300 continues to 315 and if the IoT device 100 does include stored ownership information the method 300 continues to 325. In this exemplary scenario, the only component currently identified in the TPM 125 is the commissioning server 210. Accordingly, the IoT device 100 does not currently include any ownership information and the method 300 continues to 315.

In 315 the IoT device 100 establishes a communication channel with the commissioning server 210 via the network connection. Establishing the communication channel may include the IoT device 100 sending a first signal to the commissioning server that includes an indication of the ID number corresponding to the IoT device 100. In response to the first signal, the commissioning server 210 may identify the ID number corresponding to the IoT device 100 and determine whether there is an association between the ID number of the IoT device 100 and contact information for a component permitted to configure the IoT device 100 (e.g., IP address of the end-point server 220). Establishing the communication channel may also include satisfying any security requirements of the commissioning server 210. For example, the security requirements may relate to an exchange of keys between the IoT device 100 and the commissioning server 210, an exchange of credential information, or any other type of information that indicates that the IoT device 100 is a trusted device. If the commissioning server 210 is unable to find any stored associated for the IoT device 100 or any of the security requirements are not satisfied, the commissioning server may terminate the communication channel.

In 320, the IoT device 100 receives the ownership information from the commissioning server 210. This may include the IP address of the end-point server 220. The IoT device 100 stores the ownership information in the TPM 125. Subsequently, the communication channel between the IoT device 100 and the commissioning server 210 may be terminated. For example, the reception of ownership information may trigger the IoT device 100 to power cycle. The power cycle enables the IoT device 100 to both terminate the communication channel with the commissioning server and return to 310 where the IoT device 100 determines whether ownership information is stored on the IoT device 100. However, a power cycle is not required and the exemplary embodiments may apply to any operation or operations that cause the IoT device 100 to return to 310. Thus, as will be described below with regard to 325-335, triggering the IoT device 100 to power cycle after receiving the ownership information may cause the IoT device 100 to establish a communication channel with the commissioning server 220.

In 310, the IoT device 100 determines whether ownership information is stored on the IoT device 100. As demonstrated above in 315-320, the IoT device 100 has previously received and stored ownership information in the TPM 125. Thus, the IoT device 100 currently includes stored ownership information and the method 300 continues to 325.

In 325, the IoT device 100 establishes a communication channel with the end-point server 220 via the network connection. Establishing the communication channel may include the IoT device 100 sending a first signal to the end-point server 220 that includes an indication of the ID number corresponding to the IoT device 100. In response to the first signal, end-point server 220 may retrieve configuration information corresponding to the IoT device 100. Establishing the communication channel may also include satisfying any security requirements of the end-point server 220. For example, the security requirements may relate to an exchange of keys between the IoT device 100 and the end-point server 220, an exchange of credential information, or any other type of information that indicates that the IoT device 100 is a trusted device.

In 330, the IoT device 100 receives configuration information from the end-point server 220. Subsequently, in 335, the IoT device 100 operates in accordance with the configuration information.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
    at an internet of things (IoT) device:
    identifying a predetermined condition which the IoT device uses to trigger itself to generate a first signal;
    transmitting, via a network, the first signal to a first server based on identifying the predetermined condition;
    receiving ownership information from the first server, wherein the ownership information includes contact information for a second server that is configured to provide configuration information to the IoT device;
    transmitting a second signal to the second server;
    receiving configuration information from the second server; and
    performing an operation based on the configuration information.

2. The method of claim 1, further comprising:
    storing the ownership information in a dedicated storage component.

3. The method of claim 1, wherein contact information for the first server is stored in a dedicated storage component.

4. The method of claim 1, wherein the predetermined condition includes a transition to a power on state.

5. The method of claim 1, further comprising:
    executing a power cycle based on receiving the ownership information.

6. The method of claim 5, wherein prior to executing the power cycle, the ownership information is stored in a dedicated storage component.

7. The method of claim 5, wherein the IoT device transmits the second signal to the second server based on identifying that the power cycle occurred.

8. The method of claim 1, further comprising:
    after receiving the configuration information, identifying the predetermined condition;
    transmitting a further signal to the first server; and
    receiving further ownership information from the first server, wherein the further ownership information includes contact information for a third server that is configured to provide configuration information to the IoT device.

9. The method of claim 1, wherein the contact information for the second server is an internet protocol (IP) address.

10. The method of claim 1, wherein a first communication channel is established between the IoT device and the first server at a first time and a second communication channel is established between the IoT device and the second server at a second time.

11. The method of claim 10, wherein the first communication channel is terminated based on receiving the ownership information.

12. An Internet of Things (IoT) device, comprising:
    a transceiver configured to establish a connection with a network; and
    a processor configured to execute instructions, comprising:
    identifying a predetermined condition which triggers the IoT device uses to trigger itself to generate a first signal;
    generating the first signal that is to be transmitted to a first server based on identifying the predetermined condition;
    receiving ownership information from the first server, wherein the ownership information includes contact information for a second server that is configured to provide configuration information to the IoT device;
    generating a second signal that is to be transmitted to a second server;
    receiving configuration information from the second server; and
    performing an operation based on the configuration information.

13. The IoT device of claim 12, further comprising:
    a dedicated storage component, wherein contact information for the first server and the contact information for the second server are stored in the dedicated storage component.

14. The IoT device of claim 13, wherein the dedicated storage component is a trusted platform module (TPM).

15. The IoT device of claim 12, wherein the predetermined condition includes a transition to a power on state.

16. The IoT device of claim 12, wherein the instructions further comprise: executing a power cycle based on receiving the ownership information.

17. The IoT device of claim 16, wherein the IoT device transmits the second signal to the second server based on identifying that the power cycle occurred.

18. The IoT device of claim 12, wherein a first communication channel is established between the IoT device and the first server at a first time and a second communication channel is established between the IoT device and the second server at a second time.

19. The IoT device of claim 18, wherein the first communication channel is terminated based on receiving the ownership information.

20. A non-transitory computer-readable storage medium including a set of instruction that is executable by a processor to cause the processor to perform operations, comprising:
    identifying a predetermined condition which triggers the IoT device uses to trigger itself to generate a first signal;
    generating the first signal that is to be transmitted to a first server based on identifying the predetermined condition;
    receiving ownership information from the first server, wherein the ownership information includes contact information for a second server that is configured to provide configuration information to the ToT device;
    generating a second signal that is to be transmitted to a second server;
    receiving configuration information from the second server; and
    executing an operation based on the configuration information.

* * * * *

UNITED STATES PATENT AND TRADEMARK OFFICE
CERTIFICATE OF CORRECTION

PATENT NO.        : 11,108,588 B2
APPLICATION NO.   : 16/280363
DATED             : August 31, 2021
INVENTOR(S)       : Milea et al.

Page 1 of 1

It is certified that error appears in the above-identified patent and that said Letters Patent is hereby corrected as shown below:

In the Claims

Claim 12, Column 12, Line 1:
"identifying a predetermined condition which triggers the" should read "identifying a predetermined condition which the"

Claim 20, Column 12, Line 43:
"identifying a predetermined condition which triggers the" should read "identifying a predetermined condition which the"

Claim 20, Column 12, Line 52:
"provide configuration information to the ToT device" should read "provide configuration information to the IoT device"

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*